(12) United States Patent
Perelli et al.

(10) Patent No.: US 12,386,389 B2
(45) Date of Patent: Aug. 12, 2025

(54) COMPUTING DEVICE AND DOCK ASSEMBLY

(71) Applicant: LENOVO (SINGAPORE) PTE. LTD, Singapore (SG)

(72) Inventors: Thomas Perelli, Morrisville, NC (US); Ali Ent, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 53 days.

(21) Appl. No.: 17/877,965

(22) Filed: Jul. 31, 2022

(65) Prior Publication Data

US 2024/0036604 A1   Feb. 1, 2024

(51) Int. Cl.
*G06F 1/16*   (2006.01)

(52) U.S. Cl.
CPC .......... *G06F 1/1632* (2013.01); *G06F 1/1616* (2013.01); *G06F 1/1618* (2013.01); *G06F 1/1647* (2013.01); *G06F 1/1649* (2013.01); *G06F 1/1654* (2013.01); *G06F 1/1681* (2013.01); *G06F 1/1633* (2013.01); *G06F 1/1637* (2013.01); *G06F 1/1656* (2013.01); *G06F 1/1683* (2013.01)

(58) Field of Classification Search
CPC .... G06F 1/1632; G06F 1/1616; G06F 1/1618; G06F 1/1647; G06F 1/1649; G06F 1/1654; G06F 1/1681; G06F 1/1633; G06F 1/1637; G06F 1/1656; G06F 1/1683

See application file for complete search history.

(56) References Cited

U.S. PATENT DOCUMENTS

| | | | | |
|---|---|---|---|---|
| 6,231,371 B1* | 5/2001 | Helot | ..................... | G06F 1/1632 361/679.41 |
| 6,798,647 B2* | 9/2004 | Dickie | ................... | G06F 1/1632 361/679.04 |
| 7,447,527 B2* | 11/2008 | Lin | ......................... | H04M 1/021 455/566 |
| 7,595,981 B2* | 9/2009 | Chen | ..................... | G06F 1/1632 455/518 |
| 7,915,986 B2* | 3/2011 | Lu | ........................ | H04M 1/0216 335/219 |
| 8,842,429 B2* | 9/2014 | Ahn | ...................... | G06F 1/1656 361/679.41 |
| 8,904,165 B2* | 12/2014 | Reeves | .................. | G06F 3/0484 345/1.3 |
| 9,053,250 B2* | 6/2015 | Halim | ..................... | G06F 3/147 |
| 9,116,663 B2* | 8/2015 | Prociw | ....................... | G06F 3/14 |
| 9,201,593 B2* | 12/2015 | Collopy | ................ | G06F 1/1616 |
| 9,740,237 B2* | 8/2017 | Moore | .................. | G06F 1/1669 |
| 9,939,842 B2* | 4/2018 | Correll, Jr. | ............. | G06F 1/1607 |

(Continued)

OTHER PUBLICATIONS

NexDock, NexDock Touch, Jun. 30, 2020, https://nexdock.com/blog/nexdock-touch/ (Year: 2020).*

(Continued)

*Primary Examiner* — Allen L Parker
*Assistant Examiner* — Martin Antonio Asmat Uceda
(74) *Attorney, Agent, or Firm* — Brian J. Pangrle

(57) ABSTRACT

An assembly can include a clamshell computing device that includes a display, a keyboard and a side connector; and a clamshell dock that includes an auxiliary display and a side connector that mates with the side connector of the clamshell computing device.

18 Claims, 10 Drawing Sheets

(56) References Cited

U.S. PATENT DOCUMENTS

| | | | |
|---|---|---|---|
| 11,106,250 B2* | 8/2021 | Weldon | G06F 1/1681 |
| 2006/0135225 A1* | 6/2006 | Lin | H04M 1/0222 |
| | | | 455/575.1 |
| 2008/0026802 A1* | 1/2008 | Carlson | G06F 1/1616 |
| | | | 455/575.1 |
| 2009/0021903 A1* | 1/2009 | Chen | G06F 1/1656 |
| | | | 361/679.55 |
| 2010/0045611 A1* | 2/2010 | Nelson | H04L 67/34 |
| | | | 455/3.06 |
| 2013/0109371 A1* | 5/2013 | Brogan | G06F 8/60 |
| | | | 361/679.09 |
| 2014/0211108 A1* | 7/2014 | Matsumoto | G06F 1/1616 |
| | | | 248/346.03 |
| 2019/0377387 A1* | 12/2019 | Kao | H05K 5/03 |
| 2021/0041915 A1* | 2/2021 | Moser | G06F 1/1649 |
| 2021/0405705 A1* | 12/2021 | Rose | G06F 1/1647 |
| 2022/0273081 A1* | 9/2022 | Matthews, Jr. | A45C 11/00 |
| 2022/0342446 A1* | 10/2022 | Gagne-Keats | G06F 3/1446 |

OTHER PUBLICATIONS

TheVerge, Dieter Bohn, "Microsoft Surface Duo review: double troubles", Sep. 10, 2020, https://www.theverge.com/21428763/microsoft-surface-duo-review (Year: 2020).*

Nexdockspec, NexDock Touch, Jun. 30, 2020, https://nexdock.com/tech-specs/ (Year: 2020).*

Hpenvy, HP Envy 13 (2020) release date, price and specs, 2020, https://www.tomsguide.com/news/hp-envy-13-2020 (Year: 2020).*

* cited by examiner

COMPUTING DEVICE AND DOCK ASSEMBLY

TECHNICAL FIELD

Subject matter disclosed herein generally relates to technology for computing systems or other systems.

BACKGROUND

A computing system can be a clamshell system that can fold and open and can include, for example, a base housing and a display housing.

SUMMARY

An assembly can include a clamshell computing device that includes a display, a keyboard and a side connector; and a clamshell dock that includes an auxiliary display and a side connector that mates with the side connector of the clamshell computing device. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
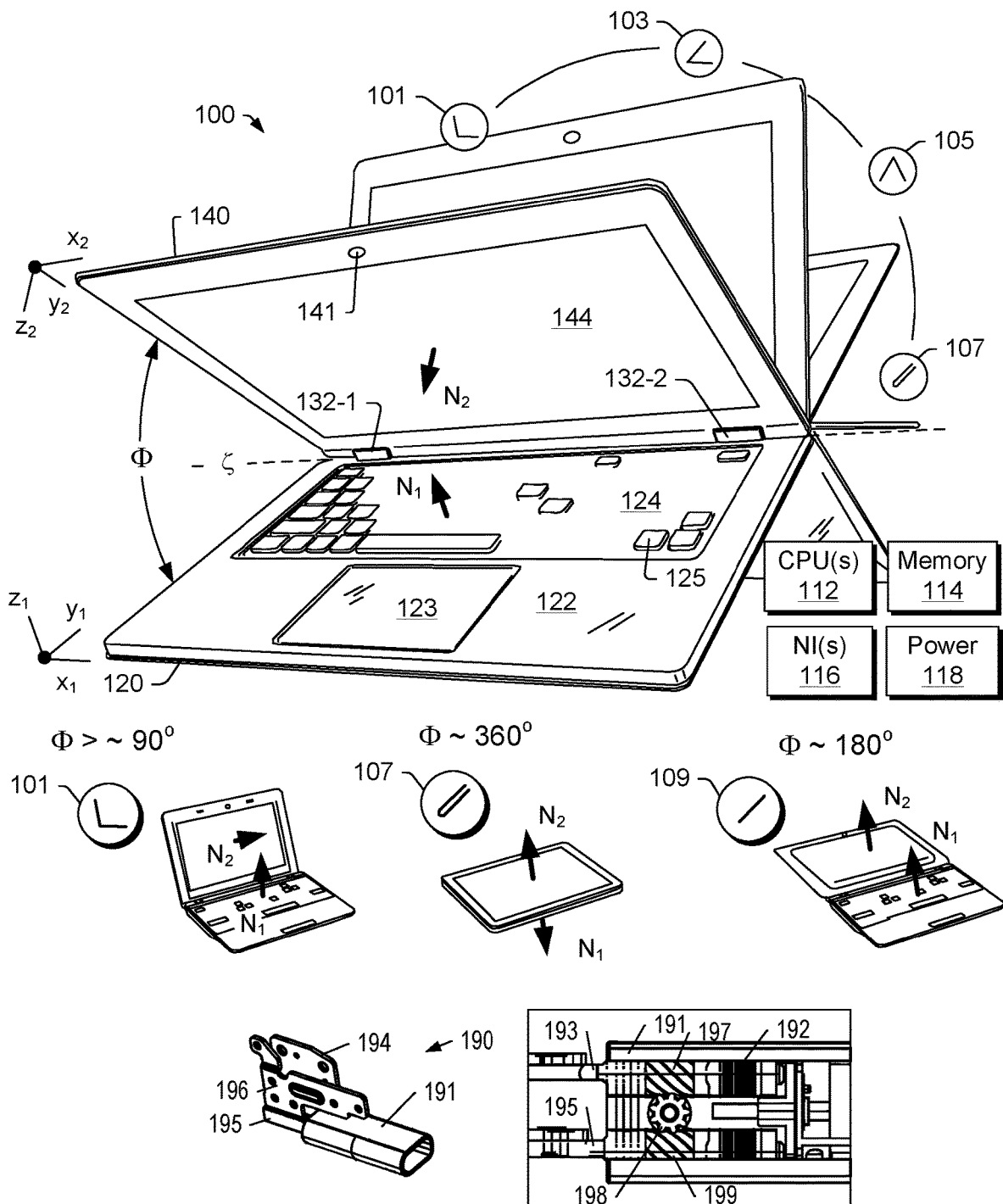
FIG. 1 is a diagram of an example of a computing device.

FIG. 1 shows an example of a computing device 100 (e.g., a computing system) that includes a keyboard housing 120 and a display housing 140 that are pivotable with respect to each other via movement about one or more hinges 132-1 and 132-2 (e.g., hinge assemblies). The computing device 100 may be a system such as, for example, a computing system (e.g., an information handling device, etc.).

As an example, the computing device 100 may include one or more processors 112, memory 114 (e.g., one or more memory devices), one or more network interfaces (NIs) 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144 and can include a camera 141 mounted in a bezel region of a bezel that surrounds the display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

As an example, a hinge assembly may be a swivel hinge assembly that can be centrally located such that a display housing can be swiveled (e.g., rotated) with respect to a keyboard housing while also being able to be rotated between a closed clamshell orientation and various open clamshell orientations. As to an example of a swivel hinge assembly, consider the LENOVO THINKPAD TWIST computing device swivel hinge assembly, which includes axles and a turntable where the turntable allows for swiveling of housings (e.g., twisting) while the axles allow for closing and opening of the housings.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the computing device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the computing device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the computing device 100, the keys 125 may be contacted by the users hand or hands. A user may perceive the springiness of the keys 125 as being somewhat undesirable. For example, springy keys may interfere with a user's ability to comprehend or sense force that is sufficient to grasp the computing device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the computing device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

FIG. 1 also shows an example of a hinge assembly 190, which may be utilized as the hinge 132-1 and/or the hinge 132-2. As shown in FIG. 1, the hinge assembly 190 includes a housing 191 with opposing sides, axles 193 and 195 with corresponding axes, saddles 194 and 196, gears 197, 198 and 199 and a tensioning mechanism 192 (e.g., a stack of coned washers, etc.). In the hinge assembly 190, the gear 198 is an intermediate gear that is disposed between the gears 197 and 199. As shown, the intermediate gear 198 has a rotational axis that is orthogonal to the rotational axes of the gears 197 and 199. In such an example, the intermediate gear 198 can allow for spacing of axles 193 and 195.

In the example of FIG. 1, the saddles 194 and 196 can be operatively coupled to respective housings of a device such that the housings can be oriented from an approximately 0 degree closed orientation (e.g., a closed clamshell) to an approximately 360 degree open orientation (e.g., a tablet orientation).

As an example, a computing device that includes housing coupled by one or more hinge assemblies can include one or more sensors that can sense orientation, directly and/or indirectly. For example, housings can include accelerometers, gravimeters, gyroscopes, etc., where signals can be utilized to determine an orientation of the housings with respect to one another. As an example, a computing device can include one or more magnetic field sensors, light sensors, etc., which may be able to sense presence of one housing with respect to another, for example, when a computing device is in a tablet orientation. As an example, a hinge assembly may be provided with a magnet, a sensor, circuitry, etc., which can provide for orientation sensing to determine an orientation of one housing with respect to another.

Figure 2:
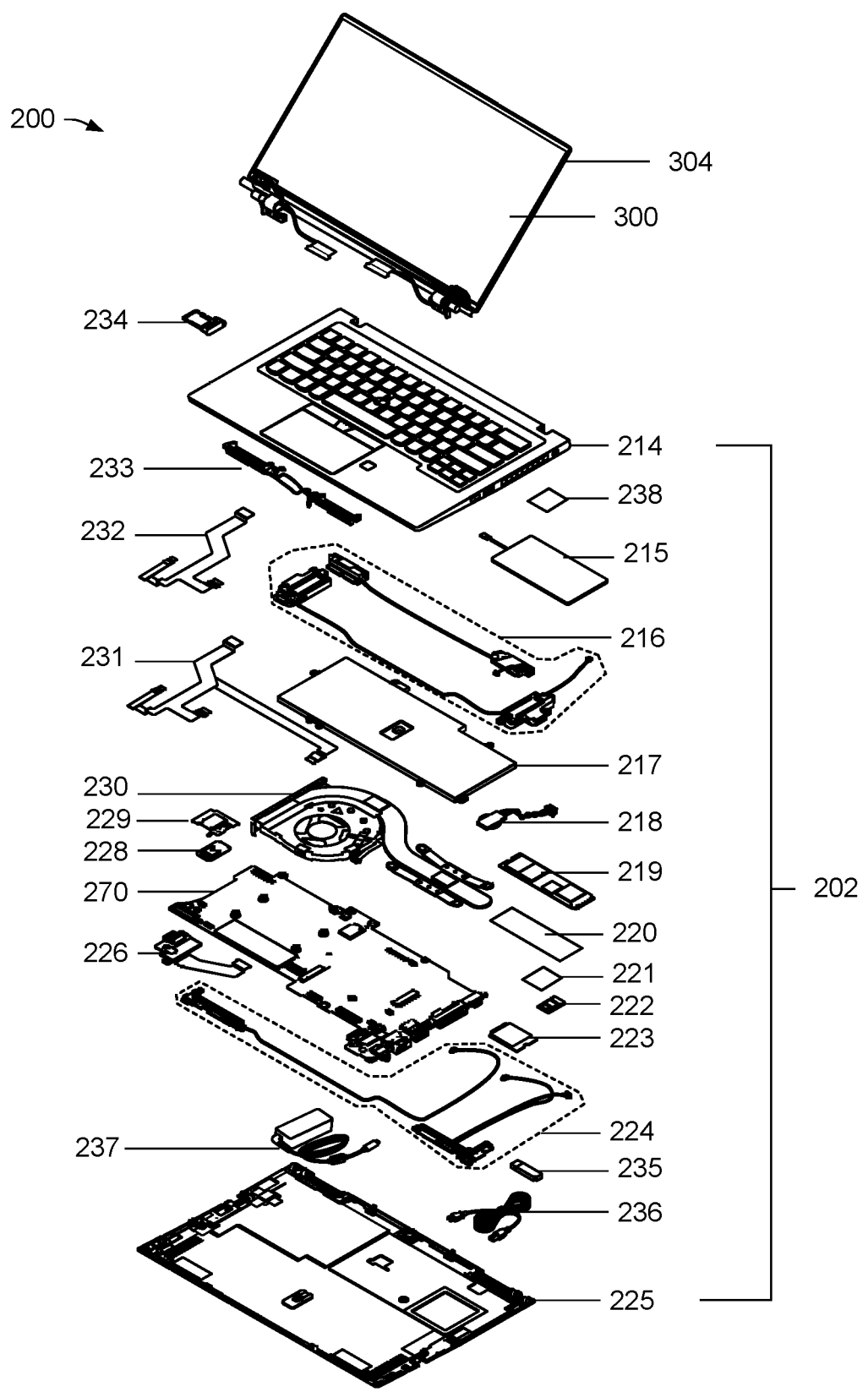
FIG. 2 is a diagram of an example of a computing device or computing system.

FIG. 2 shows an exploded perspective view of a computing device 200 as including various components, which can include, for example, a display assembly 300, a housing 304 (e.g., a display housing), a keyboard bezel assembly with a keyboard 214, a touchpad assembly 215, a speaker kit 216, a built-in battery 217, a coin-cell battery 218, a solid-state drive 219, a thermal pad 220, NFC module foam 221, a NFC module 222, a wireless-WAN card 223, a wireless-WAN antenna assembly 224, a base cover assembly 225, a USB and power board 226, a system board 270, a fingerprint reader module 228, a fingerprint reader bracket 229, a thermal fan assembly 230, a trackpad and fingerprint reader cable 231 or 232, a wireless-LAN antenna assembly 233, a SIM-card tray 234, a recovery USB 235, a power cord 236, an AC power adapter 237, an orientation sensor 238 (e.g., an accelerometer, gyroscope, magnetic field sensor, etc.). The computing device 200 may be referred to as a computing system that can include various components, circuitry, etc.

In the example of FIG. 2, various components can form a housing 202, which may be referred to as a base housing and/or a keyboard housing, where the housing 202 may be coupled to the housing 304 via one or more hinge assemblies, etc. For example, the computing device 200 can include a first housing 202 coupled to a second housing 304 via one or more hinge assemblies (see, e.g., one or more hinge assemblies 190 of FIG. 1, 326 of FIG. 3, etc.). As an example, a hinge assembly may be a single axle and/or axis hinge assembly or may be a multi-axle and/or multi-axis hinge assembly.

Figure 3:
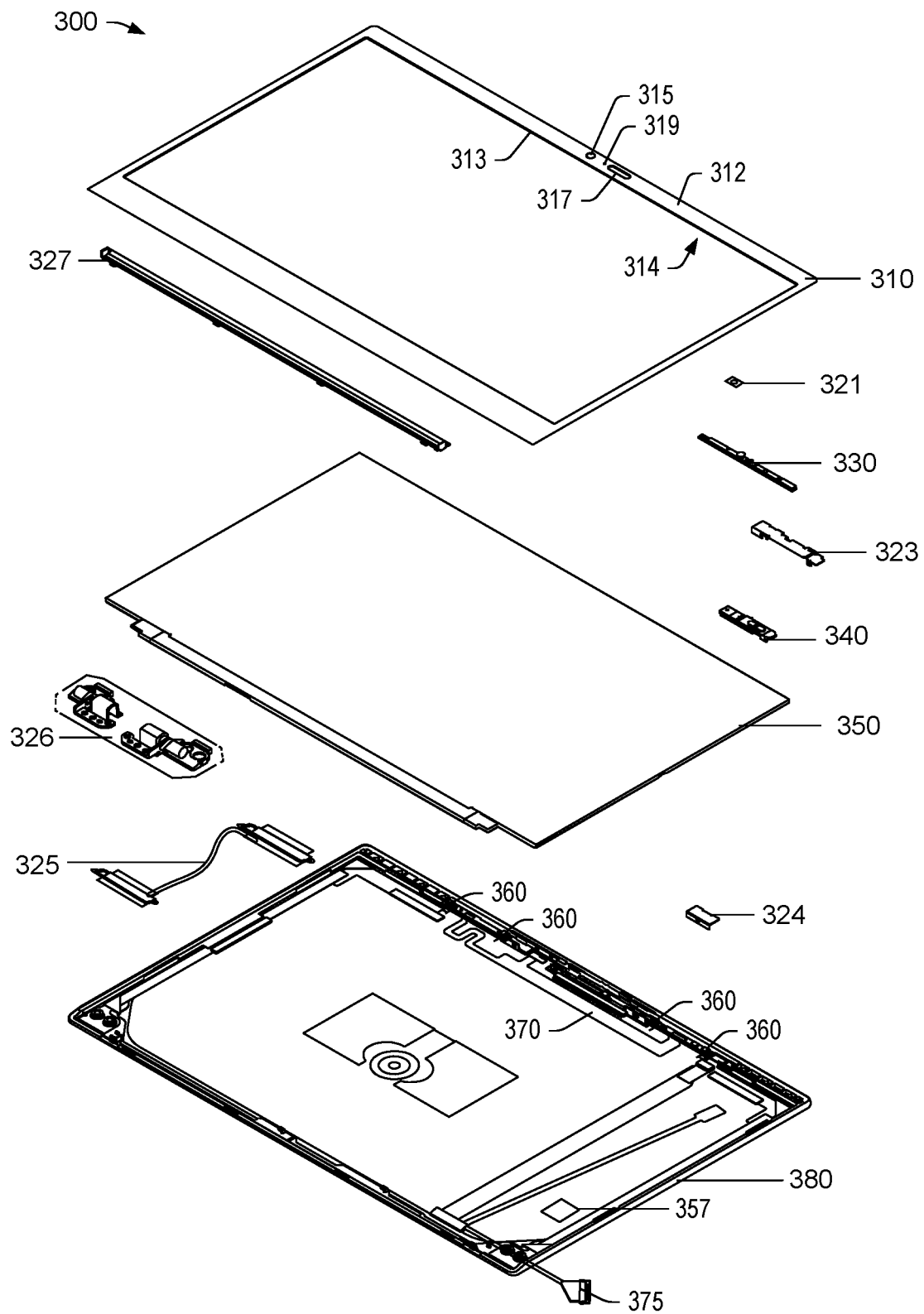
FIG. 3 is a diagram of an example of a display assembly of the computing device or computing system of FIG. 2.

FIG. 3 shows an exploded perspective view of the display assembly 300 of FIG. 2 as including various components, which can include, for example, a bezel 310, a foam component for an IR LED camera 321, a camera assembly 330, a stopper 323, a shutter 340, a display panel 350, an orientation sensor 357 (e.g., an accelerometer, gyroscope, magnetic field sensor, etc.), a support plate 324, one or more microphones 360, wiring 370, one or more wiring connectors 375, a back side (rear) cover assembly 380, a display cable 325, one or more hinge assemblies 326, and a display bezel frame component 327.

In the example of FIG. 2 and FIG. 3, the computing device 200 can include various media capture components. For example, a camera can be a media capture component, a microphone can be a media capture component, etc. A media capture component may be an audio media capture component, a video media capture component, a still image media capture component, etc.

As shown, the bezel 310 includes a front surface 312 and an opposing rear surface 314 where various openings extend between the front surface 312 and the rear surface 314. For example, as shown, the bezel 310 includes a display opening 313, a camera opening 315, a shutter control opening 317, and an IR camera opening (e.g., where an IR camera is included, noting that a camera may be a combined visible and IR camera).

As shown, the camera assembly 330 couples to the back side cover assembly 380 where the wiring 370 operatively couples to the camera assembly 330 and to the one or more microphones 360. The display assembly 300 can be operatively coupled to other circuitry of the computing device 200, for example, via the one or more wiring connectors 375.

Figure 4:
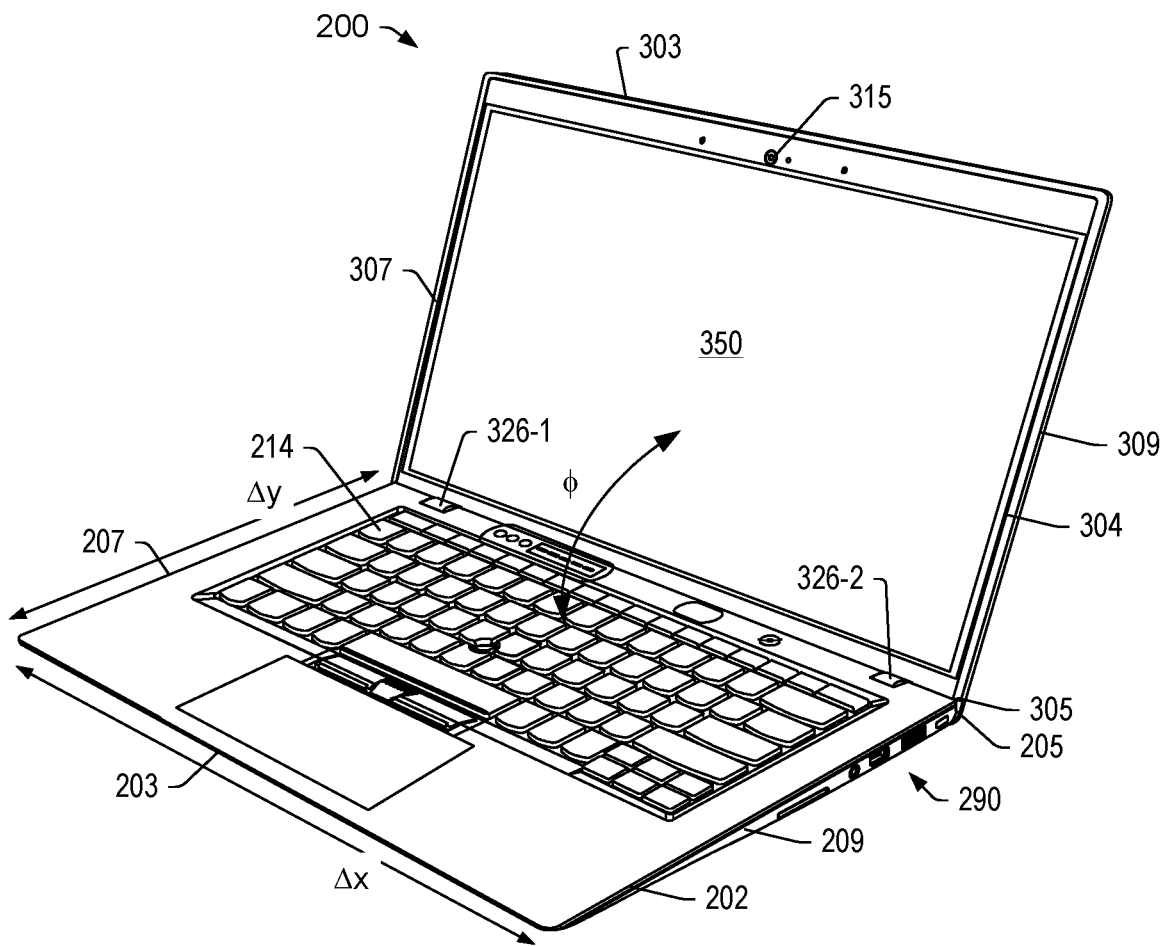
FIG. 4 is a diagram of an example of a computing device.

FIG. 4 shows an example of the computing device 200 in an open position with an open angle φ, which is slightly greater than 90 degrees. As explained, such a computing device may be opened beyond 90 degrees, for example, to 180 degrees (see, e.g., the orientation 109 of FIG. 1) or to a 360 degree position (see, e.g., the orientation 107 of FIG. 1). As an example, a notebook computing device that includes a 360 degree hinge assembly may be referred to as a convertible as it can "convert" into a tablet form factor when opened 360 degrees (see, e.g., the orientation 107 of FIG. 1).

As shown in the example of FIG. 4, the computing device 200 can include the housing 202 with a front end 203, a back end 205 and opposing sides 207 and 209 (e.g., a left side and a right side, respectively). As shown, the keyboard 214 includes keys where between the keyboard 214 and the front end 203, the housing 202 can include a touchpad. In the example of FIG. 4, the computing device 200 includes one or more hinge assemblies 326-1 and 326-2, which may include single and/or dual axle hinge assemblies.

In the example of FIG. 4, the computing device 200 includes various connectors 290 along the side 209, noting that one or more connectors may be disposed on the side 207, additionally or alternatively.

Figure 5:
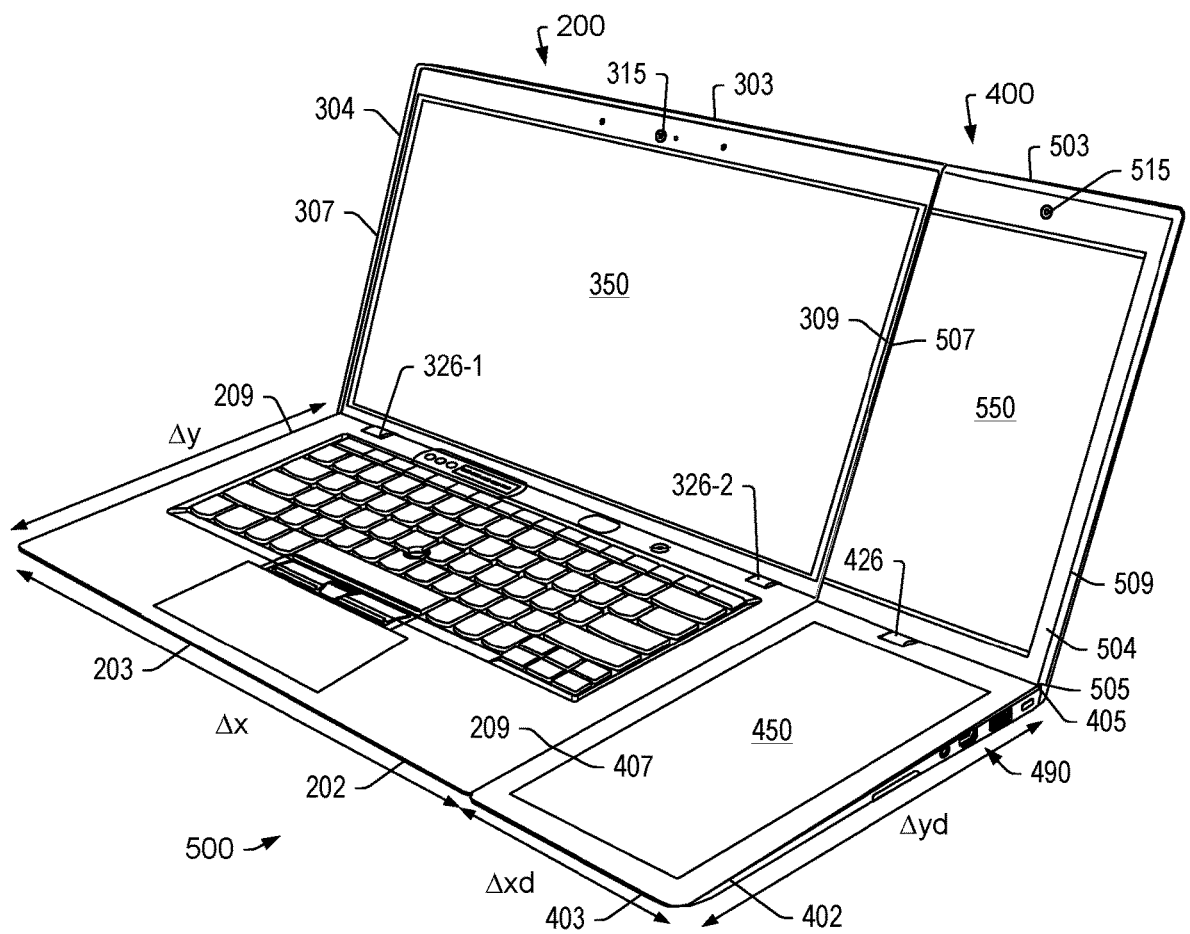
FIG. 5 is a diagram of an example of an assembly that includes a computing device docked to another device.

FIG. 5 shows an example of an assembly 500 that can include the computing device 200 and another device 400 that can physically and electrically connect to the computing device 200. As an example, an assembly can include a clamshell computing device that includes a display, a keyboard and a side connector; and a clamshell dock that includes an auxiliary display and a side connector that mates with the side connector of the clamshell computing device. In the example of FIG. 5, the device 400 can be a clamshell dock that can connect to the computing device 200.

As shown in the example of FIG. 5, the device 400 can be a clamshell device with a housing 402 coupled to a housing 504 via a hinge assembly 426, which may be a single centrally positioned hinge assembly 426 that allows for rotation of the housing 504 with respect to the housing 402 such that a display panel 550 of the housing 504 can face forward or backward while also being able to transition the device 400 between a closed and one or more open positions, which may include, for example, a 180 degree orientation and optionally a 360 degree orientation (see, e.g., the orientations 109 and 107 of FIG. 1).

As an example, the housing 504 may be closed and opened in unison with the housing 304 while the housing 402 is connected to the housing 202. In such an example, the display panel 550 may be facing the same direction as the display panel 350 or the display panel 550 may be facing a direction that is opposite to the display panel 350. As an example, when the devices 200 and 400 are in a closed position, the display panel 550 may be facing outwardly such that it is viewable by a user or users. As mentioned, the device 200 can include a centrally located hinge assembly that allows for rotation of the housing 304 with respect to the housing 202. In such an example, the display panel 350 may face forward or may face backward. Where both of the devices 200 and 400 include swivel hinge assemblies for the housings 304 and 504, the display panels 350 and 550 may face forward, face backward or be mixed facing, one facing forward and one facing backward. In a closed position of the assembly 500, the display panel 350 may be facing the keyboard 214 or it may be facing outwardly, similarly, the display panel 550 may be facing a surface 450 or it may be facing outwardly. Hence, with one or more swivel hinge assemblies, a user can orient one or more of the display panels 350 and 550 as may be desired.

In the example of FIG. 5, the device 400 has dimensions Δxd and Δyd where Δyd can be approximately equal to Δy of the device 200. In a closed position, the device 200 can provide for substantial alignment of the front ends 203 and 303 and the device can provide for substantial alignment of the front ends 403 and 503. Where the devices 200 and 400 are coupled together as the assembly 500, in a closed position, the front ends 203, 303, 403 and 503 can be aligned. In an open position, the front ends 203 and 403 and the front ends 303 and 503 can be aligned. As an example, the hinge assemblies 326-1, 326-2 and 426 can have a common axis or common axes such that the housings 202, 304, 402 and 504 can be closed and opened in a smooth and coordinated manner where various alignments between housings 202, 304, 402 and 504 are maintained. As shown in FIG. 5, the housings 402 and 504 have respective back ends 405 and 505, which may be referred to as hinge ends.

As mentioned, in the example of FIG. 5, the device 400 can be referred to as a clamshell dock. In such an example, the device 400 can dock to the device 200 or, in other words, the device 200 can dock to the device 400. As shown, the left sides 407 and 507 of the device 400 are connected to the right sides 209 and 309 of the housings 202 and 304. In such an example, the device 400 can be referred to as a right side or right hand dock; noting that the device 400 may be configured as a left side or left hand dock. As an example, the devices 200 and 400 can include features for left side and/or right side docking.

As an example, the device 400 may be asymmetric. For example, the display panel 550 may provide a display area that extends further to a mating side than a non-mating side. As an example, the display panel 350 of the housing 304 may be bezel-less and may extend to the side 309 and the display panel 550 may be bezel-less and may extend to the side 507 such that, when mated, the display panels 350 and 550 form a relatively continuous display area. In such an example, the level of display surfaces may be equivalent such that a user can move a finger, a stylus, etc., across a boundary between the display panels 350 and 550 with no or minimal interruption.

As to the surface 450 of the housing 402, it may be a display surface, a keyboard surface, a number pad surface, a touchpad surface, a digitizer surface, a mouse pad surface or another type of surface. As an example, the surface 450 may be part of a unit that is selected from a plurality of different units. As an example, the housing 402 may be a battery housing that can carry an auxiliary battery that can be used to power the device 400 and another device. As an example, the surface 450 may be a surface of a wireless charger that may be, for example, a wireless charger that comports with the Qi standard. In such an example, a user may place a device on the surface 450 for wireless charging of a battery of the device. In such an example, the power to be transferred may be from a battery of the device 400 and/or via a power connection that connects the device 400 to a power source. As an example, the surface 450 may be a solar panel that can convert solar energy to electrical energy, which may provide for charging a battery, powering a device or devices, etc.

As an example, the surface 450 may be a surface of a smartphone. For example, consider the housing 402 as being a smartphone case that can receive a smartphone. In such an example, a display surface of the smartphone may be exposed directly for touch input and/or may be covered by a surface that may allow for touch input. For example, consider a transparent touch-sensitive surface that can substitute for a touch-sensitive surface of a smartphone. As an example, a touch-sensitive surface can include or be a capacitive touchscreen that can include substantially transparent indium tin oxide to form a capacitive electrode grid in a digitizer layer.

As an example, the housing 504 may be a smartphone housing and/or a smartphone case. As an example, the hinge assembly 426 may provide a connector for coupling of a smartphone, for example, optionally via a socket (e.g., a power and/or data socket). In such an example, the smartphone may make the device 400 a clamshell device that can open and close.

As an example, the device 400 may include a stylus recess for holding a stylus, which may be operable with a display panel and/or a digitizer surface.

As an example, the device 400 may be a smartphone with a flip format. For example, the device 400 may be a flip phone that can be physically connected to and physically disconnected from the computing device 200. In such an example, the dimension Δyd of the device 400 may be less than approximately 18 cm while the dimension Δxd of the device 400 may be less than approximately 15 cm. In such an example, the dimension Δyd can be greater than the dimension Δxd such that a footprint of the device 400 in a closed clamshell position is rectangular, with a long side and a short side. Where the device 400 is a smartphone, it may be physically connected to the computing device 200 for using or carrying the assembly 500 as a unit or it may be physically disconnected from the computing device 200 such that the computing device 200 and/or the device 400 can be used or carried separately.

As to an example of a use scenario, consider a person at a coffee shop where space may be limited and where the person desires more viewing area than that offered by the computing device 200 by itself. Rather than having to carry an auxiliary display device, the person may carry a flip phone (e.g., as the device 400) that is configured to physically connect to the computing device 200 to form an assembly with expanded viewing area. In such an example, the display panel 350 may be extended to the display panel 550. For example, the flip phone and the computing device 200 can operate in an extending viewing mode, which may be controlled via an app, an operating system, operating systems, an API, etc.

The example assembly 500 of FIG. 5 provides for various use scenarios, which may facilitate workflows, tasks, etc., for example, while using one or more applications executable by the computing device 200 and/or the device 400. As an example, a user may dedicate the display panel 550 to a menu for an application where a main window of the application is rendered to the display panel 350. As an example, a user may dedicate the display panel 550 to an email application while the display panel 350 is utilized for another application. As an example, the display panel 550 may be dedicated to rendering of particular information that may be germane to a video conference where the display panel 350 is utilized as a main display.

As shown in the example of FIG. 5, the computing device 200 can include the camera opening 315 for a camera and the device 400 can include a camera opening 515 for a camera (see, e.g., the camera assembly 330 of FIG. 3). As mentioned, the device 400 can include a swivel hinge assembly such that the housing 504 can be swiveled. In such an example, the assembly 500 may be utilized by two people at one location, for example, in a video conference where one of the two people can use the camera opening 515 and the display panel 550 adjusted to a suitable angle and where the other one of the two people can use the camera opening 315 and the display panel 350 adjusted to a suitable angle. In such an example, a common network connection or multiple network connections may be utilized. As explained, the device 400 may be a flip phone with cellular network circuitry such that it can establish a network connection, which, for example, may be shared or not with the computing device 200. As an example, the computing device 200 and the device 400 may be in communication with one another via a wired connection and/or a wireless connection.

Figure 6:
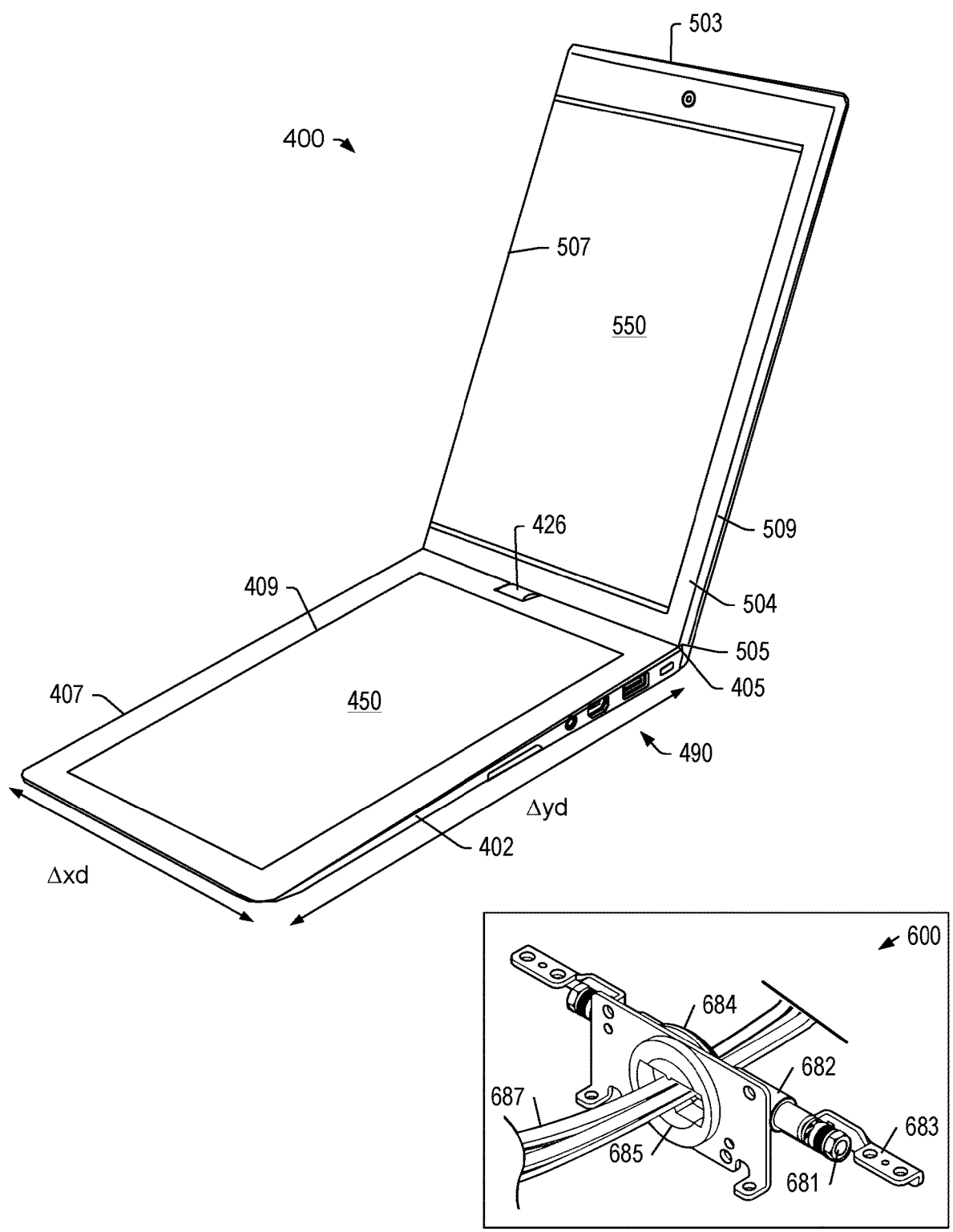
FIG. 6 is a diagram of an example of a device.

FIG. 6 shows an example of the device 400, which may be utilized by itself, without being physically connected to a computing device such as the computing device 200. As an example, the device 400 can include a processor, memory, one or more interfaces, etc. As an example, the device 400 can be utilized as an auxiliary processing device, an auxiliary memory device, an auxiliary display device, an auxiliary input device, etc. As an example, the device 400 can include a drive such as a SSD, which may be utilized to store information. In such an example, the device 400 can be utilized for purposes of secure data storage and/or file transfers.

As an example, the device 400 may be referred to as a modular clamshell dock that has a footprint smaller than that of a 12 inch clamshell computing device such that it has greater mobility that a 12 inch clamshell computing device. As an example, the device 400 can include a variety of connectors 490, which may extend and/or replicate features of a computing device such as, for example, the computing device 200.

As mentioned, the device 400 can include one or more display panels. In such an example, a display panel may be utilized for writing digital sticky notes, taking notes, viewing emails and text messages (e.g., from phone or another source), moving menus over from a primary display, viewing two applications side by side, etc. As an example, the assembly 500 of FIG. 5 can include more than two display panels. For example, consider the display panels 350 and 550 where the surface 450 can be a surface of another display panel.

FIG. 6 also shows an example of the hinge assembly 600, which may be utilized by the device 400 and/or the computing device 200. As shown, the hinge assembly 600 includes an axle 681 received at least in part by a barrel 682 where a leaf 683 is coupled to the axle 681. In such an example, various components such as washers, nuts, etc., may be fit to the axle 681 for purposes such as tensioning (e.g., friction), holding components in place, etc. As shown, the hinge assembly 600 also includes a turntable assembly 684 with a passage 685 for one or more wires 687. In such an example, the hinge assembly 680 includes two axes, one associated with the axle 681 and one associated with the turntable assembly 684. As explained, a swivel hinge assembly such as the hinge assembly 600 may be utilized to orient one housing with respect to another housing, for example, to orient a display as may be desired.

In the example of FIG. 6, the surface 450 can be part of a component or an assembly. As shown, the housing 402 can include a component space 409 that can receive a component or an assembly. As an example, a system may include a variety of components or assemblies that can be received in the component space 409. As an example, a smartphone may be received in the component space 409 such that the surface 450 is a display surface of the smartphone. In such an example, the housing 504 can include the display panel 550 as an auxiliary display, which may be operatively coupled to the smartphone and/or operatively coupled to a computing device such as the computing device 200. In such an example, a user may utilize the smartphone as held in the component space 409 to make phone calls, to connect to a network, etc. For example, consider tethering the computing device 200 to a network via a smartphone disposed in the housing 402.

As explained, the device 400 may itself be a smartphone with a flip phone form factor. In such an example, a user may utilize the device 400 to make phone calls, to connect to a network, etc. For example, consider tethering the computing device 200 to a network via cellular network and/or other network circuitry of the device 400.

Figure 7:
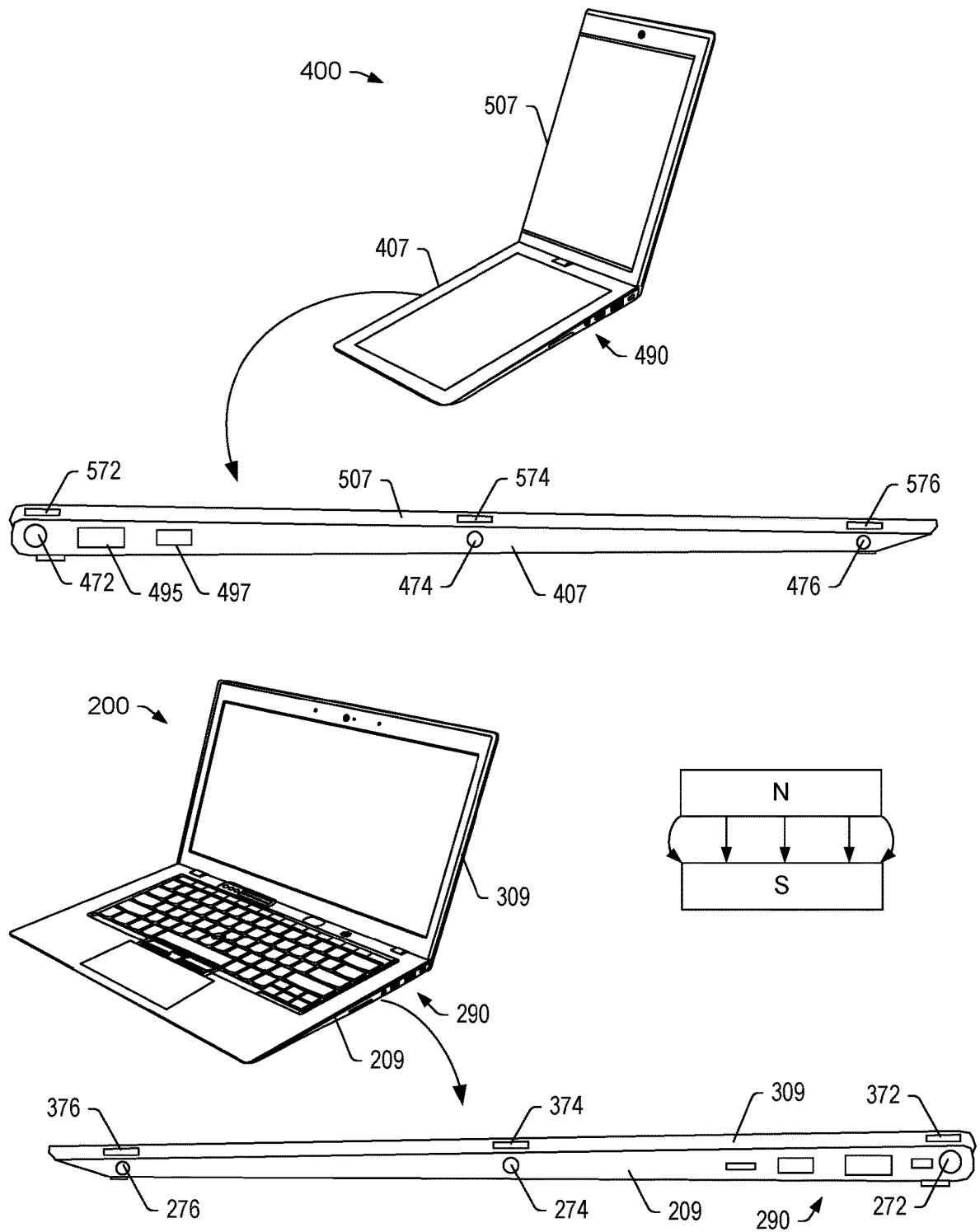
FIG. 7 is a series of diagrams of examples of device connectors.

FIG. 7 shows examples of connectors of the computing device 200 and the device 400. As shown, the housing 402 can include ferromagnetic material 472, 474 and 476 as connectors at the side 407 and the housing 504 can include ferromagnetic material 572, 574 and 576 as connectors at the side 507 while the housing 202 can include ferromagnetic material 272, 274 and 276 as connectors at the side 209 and the housing 304 can include ferromagnetic material 372, 374 and 376 as connectors at the side 309. As shown, magnets may be utilized, optionally in combination with other ferromagnetic material (e.g., material that includes iron in a state that can provide for magnetic attraction). In FIG. 7, the various ferromagnetic materials can mate to provide for secure attachment of the device 400 to the computing device 200, for example, such that the two devices 200 and 400 can be carried as the assembly 500 with reduced risk of separation.

As an example, where the housing 402 and the housing 504 include ferromagnetic materials, these materials may be configured to provide for securing the housing 402 to the housing 504 in a closed position of the device 400. In such an example, the ferromagnetic materials can help maintain the device 400 in a closed position such that a risk of it inadvertently opening is reduced. In such an approach, ferromagnetic material may provide multiple functions (e.g., keeping the device 400 closed and connecting the device 400 to another device).

As an example, connectors for the housing 202 and the housing 402 may provide a greater strength (e.g., connection force) than connectors for the housing 304 and the housing 504. As explained, the housings 304 and 504 may be moved in unison or separately. Where separate movement is desired, a magnetic force may be provide for movement in unison but be of a magnitude where a fast movement of one of the housings 304 and 504 with respect to the other separates the housings 304 and 504. In such an example, a user may separate one of the housings 304 and 504 using a single hand rather than using two hands where the two hands provide for separating (e.g., holding one still or moving the housings in opposite directions); noting that a single hand may be utilized where a thumb may push on one housing while a finger or fingers pull on the other housing (e.g., or vice versa). As an example, a connection force or connection forces may be tailored for ergonomic and/or use case considerations.

In FIG. 7, the side 407 is also shown as including one or more connectors 495 and 497. Such connectors may be spring loaded or otherwise configured to be received by one or more of the connectors 290 of the housing 202. In such an approach, connectors can provide for operatively coupling circuitry of the devices 200 and 400 and optionally for further securing the device 400 to the computing device 200.

Figure 8:
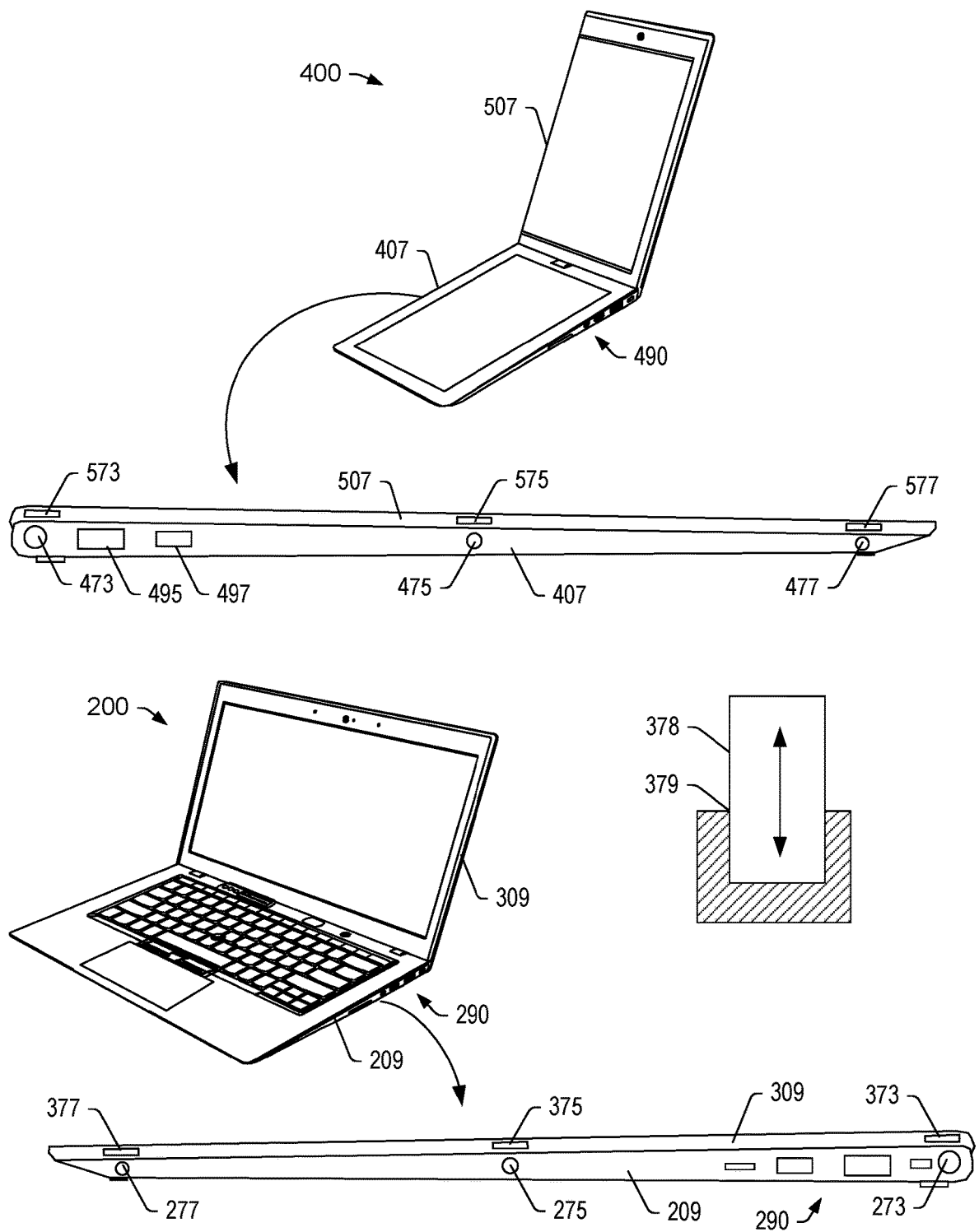
FIG. 8 is a series of diagrams of examples of device connectors.

FIG. 8 shows examples of connectors of the computing device 200 and the device 400. As shown, the housing 402 can include extensions and/or recesses 473, 475 and 477 as connectors at the side 407 and the housing 504 can include extensions and/or recesses 573, 575 and 577 as connectors at the side 507 while the housing 202 can include extensions and/or recesses 273, 275 and 277 as connectors at the side 209 and the housing 304 can include extensions and/or recesses 373, 375 and 377 as connectors at the side 309. As shown, an extension 378 can be received in a recess 379. In such an example, magnets may also be utilized, optionally in combination with other ferromagnetic material (e.g., material that includes iron in a state that can provide for magnetic attraction). In FIG. 8, the various extensions and recesses can mate to provide for secure attachment of the device 400 to the computing device 200, for example, such that the two devices 200 and 400 can be carried as the assembly 500 with reduced risk of separation.

As an example, a number of magnets can be utilized to register devices, for example, to register electrical contacts, extensions with recesses, etc. As an example, a device or devices can include spring-biased electrical contacts, which may include pogo-pins and/or bent metal that can act as a spring. In such an example, a number of magnets may be utilized to provide for alignment of electrical contacts and/or physical components such as extensions and recesses. As an example, magnetic registration can help to assure that an extension aligns with a recess, which can help to avoid forcible contact that may be detrimental to the integrity of an extension (e.g., to help reduce risk of breaking an extension).

As an example, a connector can be an electrical contact connector, an optical connector, etc. As an example, a spring-biased connector may be utilized such as, for example, a pogo-pin connector. As an example, magnets may be utilized in combination with a spring-biased connector where spring-bias is in one direction and a magnetic attraction force is in an opposite direction to help maintain robust electrical connection.

As explained, a notebook computing device can be physically coupled with clamshell dock that can streamline an assembly for a travel friendly and clean desk experience. As explained, a dock can includes ports, battery, phone integration features, a digital pad, etc., where the dock can be physically connected to a computing device to form a sleek yet elegant unified assembly. As an example, a connection can be cable-less or, for example, a cable or cables may be utilized for connection.

As an example, a device can include one or more magnets such as, for example, one or more POLYMAGNET magnets (Correlated Magnetics Research, LLC, Huntsville, Alabama). As an example, a device may include an arrangement of magnets that aims to provide attraction between components without generating an excessively strong field that may extend well beyond the magnets. As an example, coding of small magnetics arranged in series, in parallel, in one or more arrays, etc. may be utilized for magnetically coupling components of a computing device, optionally without using a mechanical coupling.

A magnet such as a POLYMAGNET magnet can be formed from rare earth magnetic material with desired patterns of north and south poles on a single piece of magnetic material. In such an approach, fields coming off of these patterns of north and south poles in turn define the feel and function of a POLYMAGNET magnet with respect to another magnet or magnets, which may also be or include one or more POLYMAGNET magnets.

Figure 9:
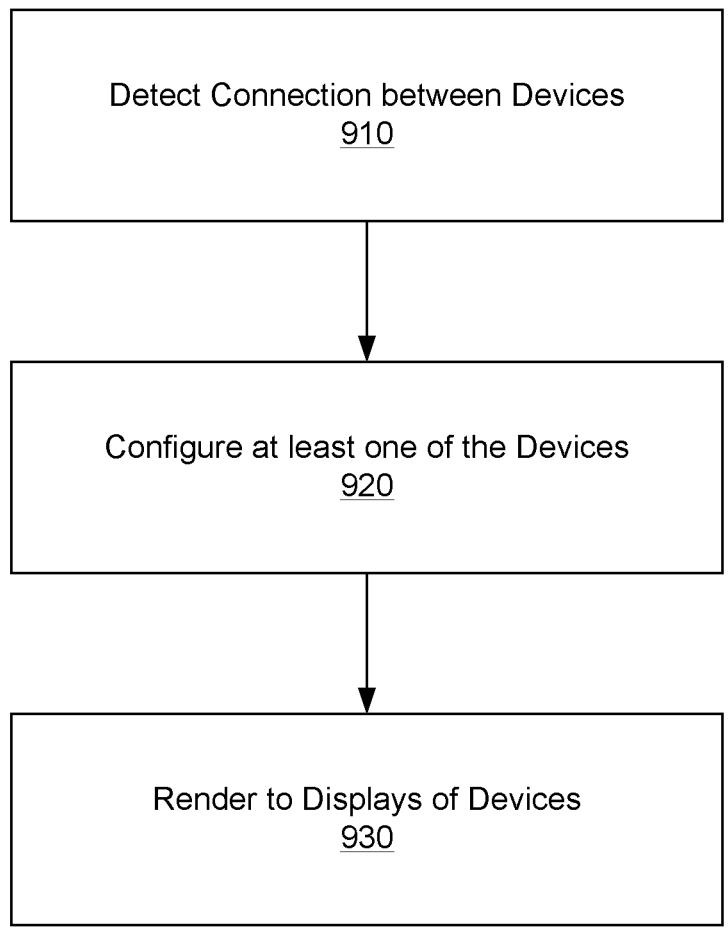
FIG. 9 is a diagram of an example of a method.

FIG. 9 shows an example of a method 900 that includes a detection block 910 for detecting a connection between devices; a configure block 920 for, responsive to the detection, configuring at least one of the devices; and a render block 930 for rendering information to displays of the devices. As explained, one device can be a clamshell computing device while another device can be a smaller clamshell device that can dock to the clamshell computing device. In such an example, one or more techniques may be utilized to detect a connection. For example, consider one or more magnets optionally with one or more magnetic field sensors, one or more electrical contacts, one or more proximity sensors, etc.

As an example, one device may be configured to utilize the other device for one or more purposes. For example, as mentioned, a display of one device may be extended to a display area of another device. Or, for example, consider utilizing cellular network circuitry of one device for establishing a network connection for the other device. As explained, an assembly may be suitable for use by multiple users, which may be, for example, sitting opposite one another where one user views one display of one device and another user views another display of another device where the devices are physically connected along a side of one housing or along sides of two housings.

As an example, an assembly can include a clamshell computing device that includes a display, a keyboard and a side connector; and a clamshell dock that includes an auxiliary display and a side connector that mates with the side connector of the clamshell computing device. In such an example, the clamshell computing device can include a display housing for the display and a keyboard housing for the keyboard coupled via a hinge assembly that defines a folding axis. In such an example, the clamshell dock can include a display housing for the auxiliary display and a base housing coupled via a hinge assembly that defines a folding axis that aligns with the folding axis of the clamshell computing device.

As an example, a clamshell dock can include a human input device. In such an example, the human input device can include a digitizer pad (e.g., operable with a stylus, etc.), a keyboard, a touchpad, etc.

As an example, a clamshell dock can include a network interface. As an example, such a clamshell dock be or can include a flip phone where the network interface may be a cellular network interface.

As an example, a bottom to top dimension of a display and a bottom to top dimension of an auxiliary display can be approximately equal where a side to side dimension of the display is greater than a side to side dimension of the auxiliary display. As to approximately equal, consider, for example, within plus or minus 10 percent of a dimension and/or, for example, within 10 mm.

As an example, a clamshell dock can include a rectangular folded footprint, where a front to back dimension exceeds a side to side dimension.

As an example, a clamshell dock can include a processor, memory and processor-executable instructions stored in the memory that are executable to establish an operating system environment. As explained, a clamshell dock may be a smartphone and/or may include a component space that can receive a smartphone. In such examples, a processor and memory may be a smartphone processor and smartphone memory. As an example, a clamshell dock can include a SIM card and associated cellular network circuitry.

As an example, a clamshell dock can include a battery. In such an example, the battery may be utilized to supply power to a computing device and/or it may be chargeable via a connection to a computing device (e.g., wired and/or wireless). As an example, a clamshell dock may be utilized in an independent mode where it is not physically attached to a computing device.

As an example, a clamshell dock can include at least one serial port. In such an example, the at least one serial port can be a side serial port or a back serial port or can include a side serial port and a back serial port. As an example, a serial port may be a USB type of port. As an example, at least one serial port of a clamshell dock can be or can include one or more of a left side serial port and a right side serial port.

As an example, a clamshell computing device can include opposing sides where a clamshell dock is attachable to either of the opposing sides of the clamshell computing device.

As an example, a clamshell dock can include a display housing for an auxiliary display and a base housing coupled by a 360 degree hinge assembly. In such an example, a clamshell computing device can include a display housing for a display and a keyboard housing for a keyboard coupled by a 360 degree hinge assembly. In such an example, the clamshell dock and the clamshell computing device can be physically coupled side to side where they can be oriented in unison and where their respective display housings may be oriented individually.

As an example, a clamshell dock can include a display housing for an auxiliary display and a base housing coupled by a central pivot hinge for at least 180 degree rotation of the display housing between a front facing position and a back facing position. In such an example, the clamshell dock and the clamshell computing device can be physically coupled side to side where they can be oriented in unison and where their respective display housings may be oriented individually. In such an example, one or both of the display housings may be twisted to face forward or to face backwards. For example, consider a closed clamshell orientation where the auxiliary display is facing outwardly such that a user may read messages, notification, etc. In such an example, circuitry of the clamshell dock and/or the clamshell computing device may be in a low power mode such that power is conserved while being able to receive messages, render notifications (e.g., calendar, etc.), etc. As an example, a clamshell dock can be mated to a clamshell computing device, where a display of the clamshell dock can be angularly adjustable independent of an angle of a display of the clamshell computing device.

As an example, a clamshell dock can include a camera. In such an example, the camera may be utilized for one or more purposes, which can include, for example, video calls, videoconferencing, etc.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 10:
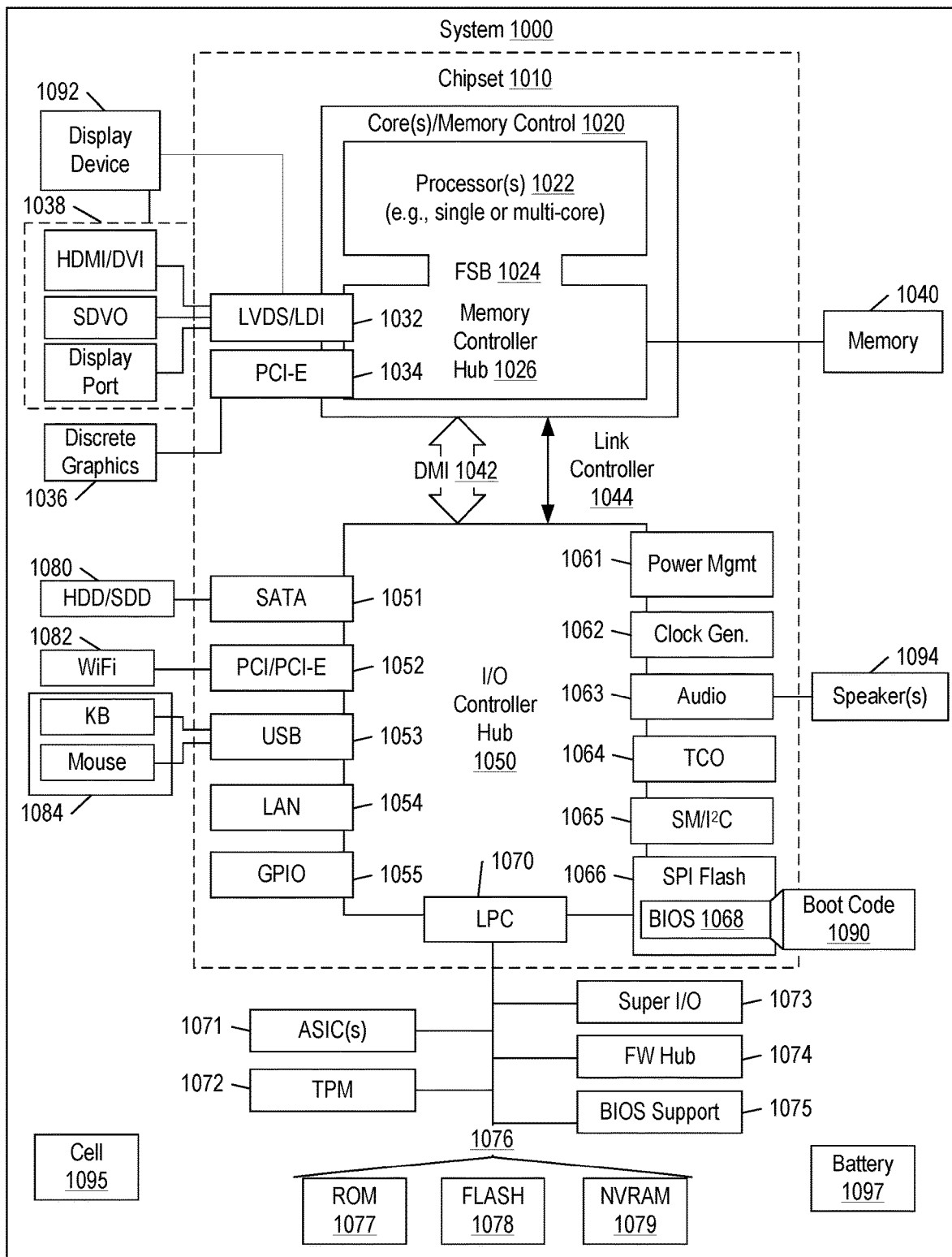
FIG. 10 is a diagram of an example of a system that includes one or more processors.

While various examples of circuits or circuitry have been discussed, FIG. 10 depicts a block diagram of an illustrative computer system 1000. The system 1000 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An assembly comprising:
   a clamshell computing device that comprises a display, a keyboard and a side connector, wherein the clamshell computing device comprises a display housing for the display and a keyboard housing for the keyboard coupled via a hinge assembly that defines a folding axis; and
   a clamshell dock that physically couples, side to side, to the clamshell computing device and that comprises an auxiliary display and a side connector that mates with the side connector of the clamshell computing device, wherein the clamshell dock comprises a display housing for the auxiliary display and a base housing coupled via a hinge assembly that defines a folding axis that aligns with the folding axis of the clamshell computing device, and wherein the base housing of the clamshell dock is physically coupled, side to side, to the clamshell computing device, the auxiliary display is angularly adjustable in unison with the display via a magnetic connection force and, upon overcoming the magnetic connection force, is angularly adjustable independent of an angle of the display.

2. The assembly of claim 1, wherein the clamshell dock comprises a human input device.

3. The assembly of claim 2, wherein the human input device comprises a digitizer pad.

4. The assembly of claim 1, wherein the clamshell dock comprises a network interface.

5. The assembly of claim 4, wherein the clamshell dock comprises a flip phone.

6. The assembly of claim 1, wherein a bottom to top dimension of the display and a bottom to top dimension of the auxiliary display are within 10 mm of each other and wherein a side to side dimension of the display is greater than a side to side dimension of the auxiliary display.

7. The assembly of claim 1, wherein the clamshell dock comprises a rectangular folded footprint, wherein a front to back dimension exceeds a side to side dimension.

8. The assembly of claim 1, wherein the clamshell dock comprises a processor, memory and processor-executable instructions stored in the memory that are executable to establish an operating system environment.

9. The assembly of claim 1, wherein the clamshell dock comprises a battery.

10. The assembly of claim 1, wherein the clamshell dock comprises at least one serial port.

11. The assembly of claim 10, wherein the at least one serial port comprises a side serial port and a back serial port.

12. The assembly of claim 10, wherein the at least one serial port comprises a left side serial port and a right side serial port.

13. The assembly of claim 1, wherein the clamshell computing device comprises opposing sides and wherein the clamshell dock is attachable to either of the opposing sides of the clamshell computing device.

14. The assembly of claim 1, wherein the hinge assembly of the clamshell dock comprises a 360 degree hinge assembly.

15. The assembly of claim 14, wherein the hinge assembly of the clamshell computing device comprises a 360 degree hinge assembly.

16. The assembly of claim 1, wherein the display housing and the base housing of the clamshell dock are coupled by a central pivot hinge for at least 180 degree rotation of the display housing between a front facing position and a back facing position.

17. The assembly of claim 1, wherein the clamshell dock comprises a camera.

18. An assembly comprising:
   a clamshell computing device that comprises a display, a keyboard and a side connector; and
   a clamshell dock that comprises an auxiliary display and a side connector that mates with the side connector of the clamshell computing device, wherein the clamshell computing device comprises opposing sides and wherein the clamshell dock is attachable to either of the opposing sides of the clamshell computing device, and, wherein the clamshell dock comprises opposing sides that comprise magnets, wherein the clamshell dock is attachable to either of the opposing sides of the clamshell computing device via a magnetic connection force, and wherein the auxiliary display is angularly adjustable in unison with the display via the magnetic connection force and, upon overcoming the magnetic connection force, is angularly adjustable independent of an angle of the display.

\* \* \* \* \*